Jan. 24, 1961    R. H. REIBEL ET AL    2,969,106
SPLICE PATCH
Filed Dec. 9, 1958    3 Sheets-Sheet 1
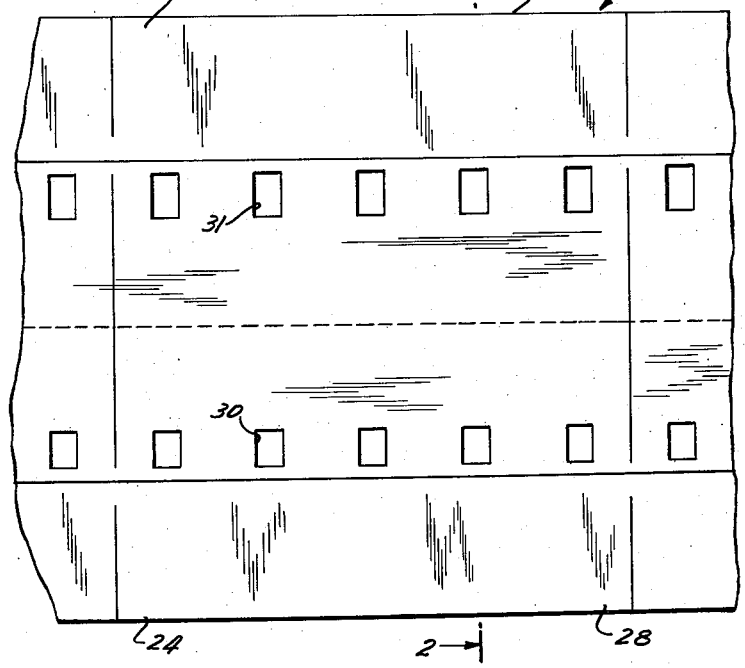
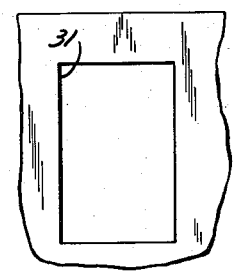
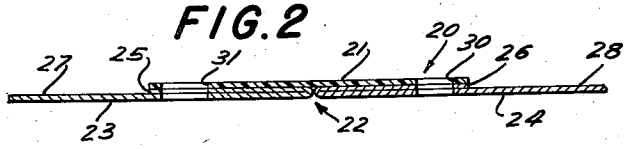
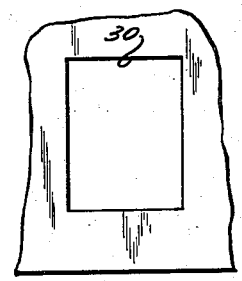
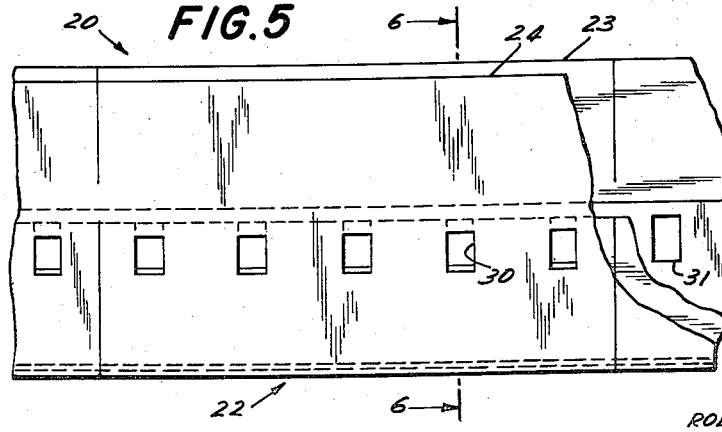
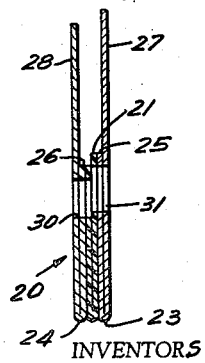
INVENTORS
ROBERT H. REIBEL
EUGENE MARTINEZ
BY MARVIN KAPILOW
Kane, Dalsimer and Kane
ATTORNEYS Jan. 24, 1961 R. H. REIBEL ET AL 2,969,106
SPLICE PATCH
Filed Dec. 9, 1958 3 Sheets-Sheet 2
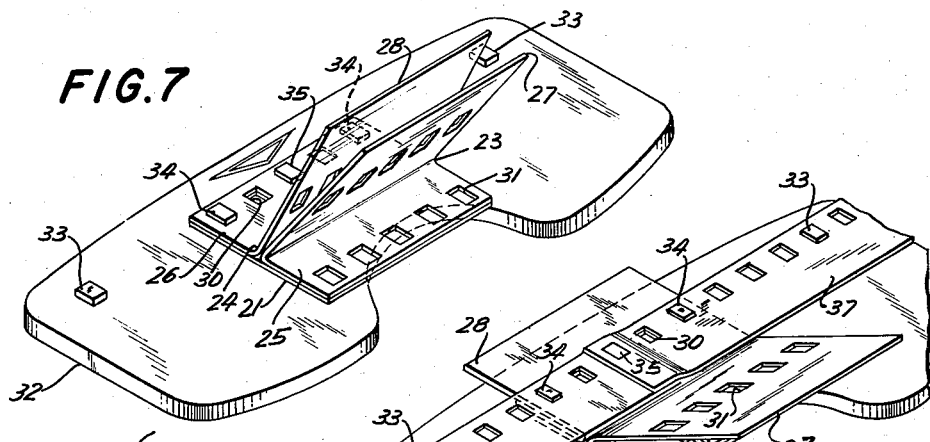
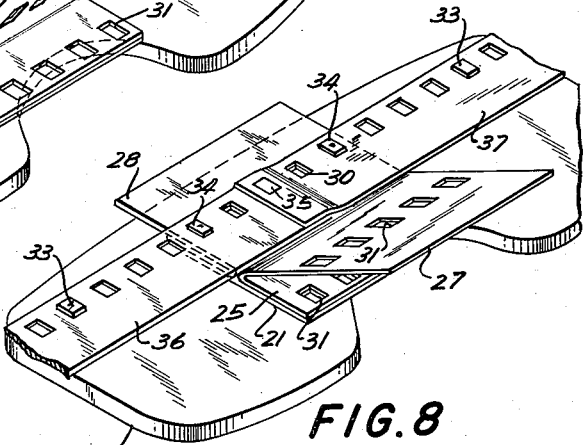
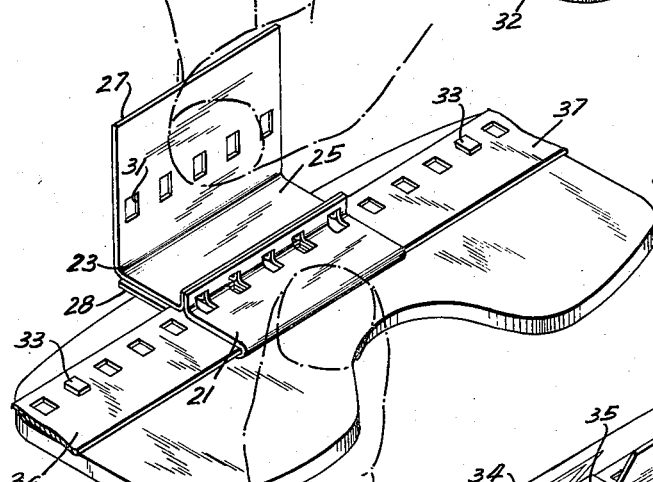
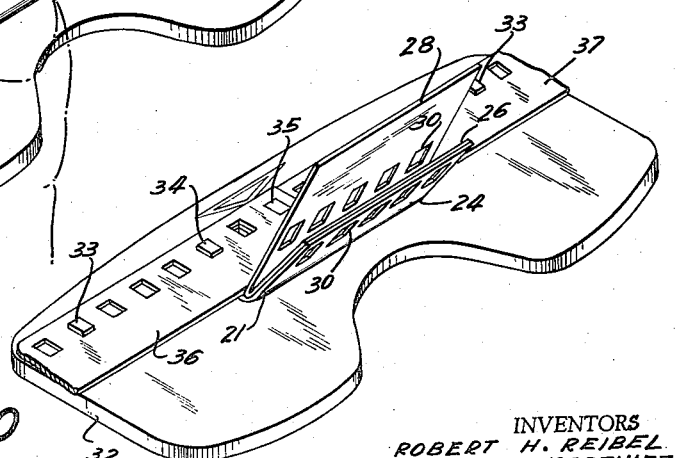
INVENTORS
ROBERT H. REIBEL
EUGENE MARTINEZ
MARVIN KAPILOW
BY Kane, Dalsimer and Kane
ATTORNEYS Jan. 24, 1961    R. H. REIBEL ET AL    2,969,106
SPLICE PATCH
Filed Dec. 9, 1958    3 Sheets-Sheet 3
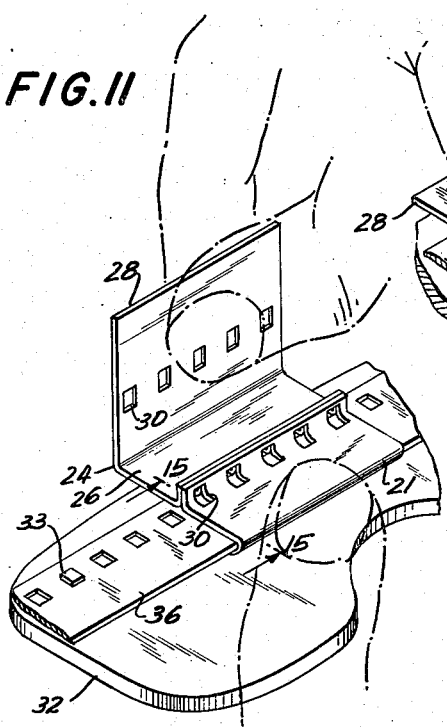
FIG. 11
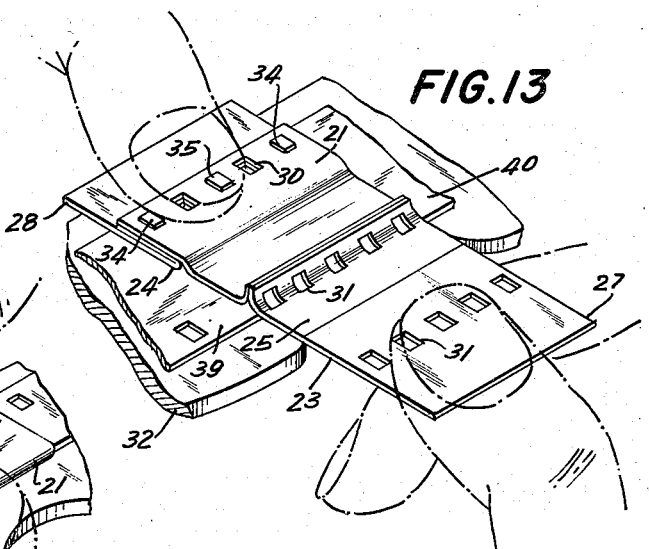
FIG. 13
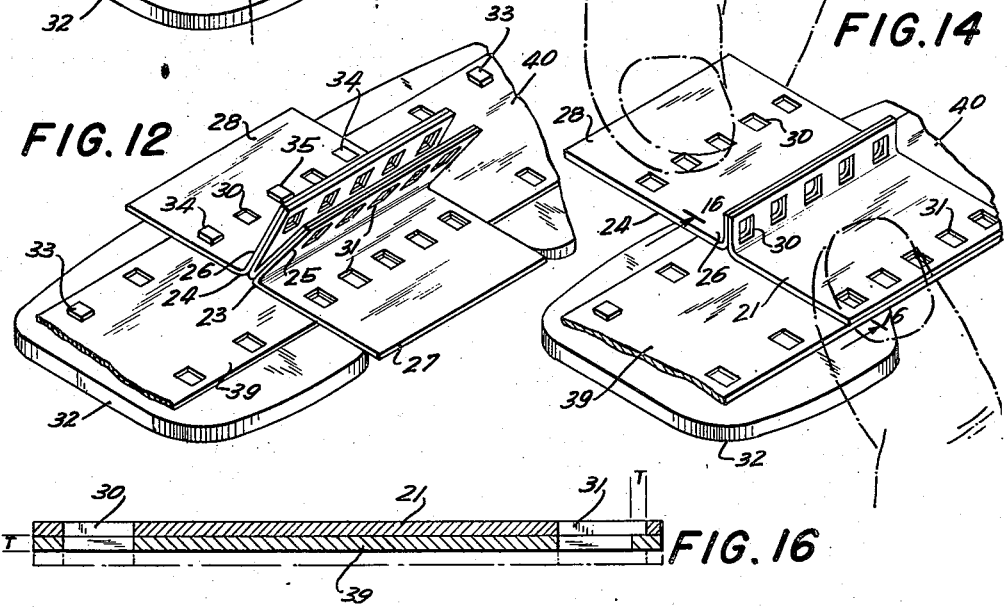
FIG. 12    FIG. 14
FIG. 16
FIG. 15
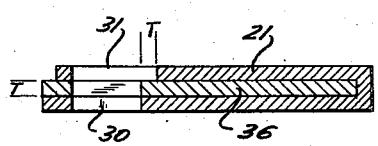
INVENTORS
ROBERT H. REIBEL
EUGENE MARTINEZ
BY MARVIN KAPILOW
Kane, Dalsimer and Kane
ATTORNEYS

United States Patent Office 2,969,106
Patented Jan. 24, 1961

2,969,106
SPLICE PATCH

Robert H. Reibel, Mount Airy Road, Croton-on-Hudson, N.Y.; Eugene Martinez, Bronx, N.Y. (28 Jaffray Park, Irvington-on-Hudson, N.Y.); and Marvin Kapilow, 15 Wells Ave., Croton-on-Hudson, N.Y.

Filed Dec. 9, 1958, Ser. No. 779,099

5 Claims. (Cl. 154—53.5)

This invention relates to improved splicers for securing two strips of film in aligned and connected relationship, and, more specifically, to an improved splice patch and method for its utilization for 8 mm., 16 mm., as well as other size movie film. Furthermore, this application is a continuation-in-part of application S.N. 688,855, filed October 8, 1957.

Prior to this invention, the splicing of such film required many separate and distinct operations which were relatively inefficient, costly, complicated, inaccurate and —above all—not conducive and sufficiently versatile to the splicing of various size film. In addition, other undesirable and inherent features of prior art splicers were their tendency to separate or crack with the passage of time, together with their inevitable and extreme difficulty of formation when the film was in the projector.

The aforementioned problems, among others, were most effectively overcome by the above-referenced application and to a much greater degree by the instant invention. Thus, a splice is provided which is easy to form, adapted to various size film and long lasting.

An object of this invention is to provide an improved splice patch which, without alteration, is adapted to be utilized in splicing film of different sizes.

Another object is to provide an improved splice patch which will not crack or permit the separation of the film strips even with the passage of time.

Still another object is to provide an improved adhesively coated splice patch which includes structure for preventing contamination of the adhesive coating while, at the same time, cooperates to facilitate the manipulation and application of the patch.

A further object is to provide an improved splice patch which may be utilized to form a splice while the film remains in a projector.

It is still a further object to provide an improved splice patch possessing critical dimensioning of relatively close tolerance while, at the same time, being economical and easy to manufacture.

An important object is to provide an improved splice patch and method for splicing film, as for example 8 mm. and 16 mm. film, such that a simple, strong and accurate splice is accomplished.

Another important object is to provide an improved splice patch adapated to the formation of a butt splice, which is invisible when projected, as well as a splice patch adapted to mend torn or broken film or sprocket openings without the loss of a frame.

A further important object is to provide a splice patch having improved finger grip flaps for liners covering adhesively coated splicing film, and improved sprocket opening dimensioning and location.

With these and other objects in mind, reference is had to the attached sheets of drawings illustrating one form of the invention wherein like characters represent like parts and in which:

Fig. 1 is a fragmentary plan view of a splice patch connected in series to other similar splice patches along opposed lines of weakening to thereby form a strip of splice patches of any selectable number;

Fig. 2 is a cross-sectional view taken along the line 2—2 of Fig. 1;

Fig. 3 is an enlarged fragmentary view of the sprocket opening located along one side of the longitudinal center of the splice patch;

Fig. 4 is a similar enlarged fragmentary view illustrating the sprocket openings located along the other side of the longitudinal center line of the splice patch which, for purposes of this invention, is preferably termed the reference side;

Fig. 5 is similar to Fig. 1 and illustrates the splice patch folded upon itself along the juncture created by the adjacent hinged corners of the splice liner panels;

Fig. 6 is a cross-sectional view taken along the line 6—6 of Fig. 5, which figures together serve to illustrate the relative dimensioning and location of the parts constituting the present splice patch;

Fig. 7 illustrates in perspective the first step in a method of forming an 8 mm. film splice by means of this invention;

Figs. 8–11 are similar views illustrating subsequent steps sequentially followed in this method of forming an 8 mm. film splice;

Fig. 12 is somewhat similar to Fig. 7 but illustrates the first step in a method of forming a 16 mm. film splice by means of this invention;

Figs. 13–14 illustrate the following steps in this method of forming a 16 mm. film splice;

Fig. 15 is a transverse cross-section taken along line 15—15 of Fig. 11;

Fig. 16 is a transverse cross-section taken along line 16—16 of Fig. 14.

Basically, the invention is directed to a splice patch which is adapted to be utilized in splicing 8 mm., 16 mm. and other size film, including 35 mm. film, as well as to a method of splicing which employs a splice patch. The splice patch, which is formed from light-transparent material and provided with adhesive on one side thereof, is of predetermined length and formed with pre-punched socket receiving openings to correspond with the sprocket receiving openings in the selected film. By means of such a patch, overlapped and butt splices may be formed quickly with the elimination of the heretofore required steps of scraping the emulsion from the film, applying cement and then clamping.

Referring now to the drawings, and Figs. 1 and 2 in particular, a splice patch—generally indicated by the numeral 20—is illustrated in series with other similar splice patches connected thereto along several partially cut lines of weakening which thusly cooperate to provide a splice patch of predetermined length. Splice patch 20 is comprised of a film 21 which is coated on one side thereof with a pressure sensitive, substantially permanently tacky adhesive material. In this connection, the film 21 is preferably fabricated from a polyester resin of the type developed by E. I. Du Pont de Nemours & Co. and known as "Mylar," which is a film made from polyethylene terephthalate, which, in turn, is a polymer formed by the condensation reaction between ethylene glycol and terephthalic acid. A liner 22 is in covering relation with respect to the adhesively coated surface of film 21, which may be fabricated from suitable material which is either porous or non-porous.

The liner 22 covers substantially the entire adhesively coated surface of film 21 and is formed in two portions 23 and 24, each of which includes panels 25 and 26, respectively, removably secured to the adhesive coated surface of film 21. Finger grip flaps 27 and 28 are integral with and hingedly connected to panels 25 and 26, respectively. As will be appreciated, finger grip flaps